United States Patent
Abramov

(10) Patent No.: US 6,911,976 B2
(45) Date of Patent: Jun. 28, 2005

(54) SYSTEM AND METHOD FOR RENDERING IMAGES USING A STRICTLY-DETERMINISTIC METHODOLOGY FOR GENERATING A COARSE SEQUENCE OF SAMPLE POINTS

(75) Inventor: Georgy Abramov, Berlin (DE)

(73) Assignee: Mental Images G.m.b.H. & Co., KG, Berlin (DE)

( * ) Notice: Subject to any disclaimer, the term of this patent is extended or adjusted under 35 U.S.C. 154(b) by 256 days.

(21) Appl. No.: 10/165,181

(22) Filed: Jun. 7, 2002

(65) Prior Publication Data
US 2003/0063082 A1 Apr. 3, 2003

Related U.S. Application Data

(60) Provisional application No. 60/297,139, filed on Jun. 7, 2001.

(51) Int. Cl.[7] ............................................. G06T 15/60
(52) U.S. Cl. ....................... 345/426; 345/611; 345/613
(58) Field of Search ................................. 345/419, 420, 345/426, 473, 611, 613; 382/232, 247, 248, 251, 254

(56) References Cited

U.S. PATENT DOCUMENTS 6,529,193 B1 * 3/2003 Herken et al. .............. 345/426

FOREIGN PATENT DOCUMENTS

| WO | WO 97 50060 | 12/1997 |
| WO | WO 98 59322 | 12/1998 |

\* cited by examiner

Primary Examiner—Mark Zimmerman
Assistant Examiner—Enrique L. Santiago
(74) Attorney, Agent, or Firm—Richard A. Jordan

(57) ABSTRACT

A system and method for generating sample points that can generate the sample points in parallel. The sample points can be used in processing in parallel, with the results subsequently collected and used as necessary in subsequent rendering operations. Sample points are generated using a coarse Halton sequence, which makes use of coarse radical inverse values $\Phi_b^{i,M}(j)$ as follows:

$$\Phi_b^{i,M}(j) = \Phi_b(jM+i)$$

where base "b" is preferably a prime number, but not a divisor of "M," and "i" is an integer. Using this definition, the s-dimensional coarse Halton sequence $U_s^{CHal,i,M}$, which may be used to define sample points for use in evaluating integrals, is defined as $$U_s^{CHal,i,M} = (\Phi_{b1}^{i,M}(j), \ldots, \Phi_{b_s}^{i,M}(j))$$

where $b_1, \ldots, b_s$ are the first "s" prime numbers that are not divisors of "M." Each value of "i" defines a subsequence that is a low-discrepancy sequence, and so can be used in connection with processing. Similarly, the union of all subsequences for all values of "i" between "zero" and "M−1" is also a low-discrepancy sequence, so results of processing using the coarse Halton sequences for all such values of "i" can be collected together and used in the same manner as if the results had been generated using a Halton sequence to define the sample points.

30 Claims, 3 Drawing Sheets

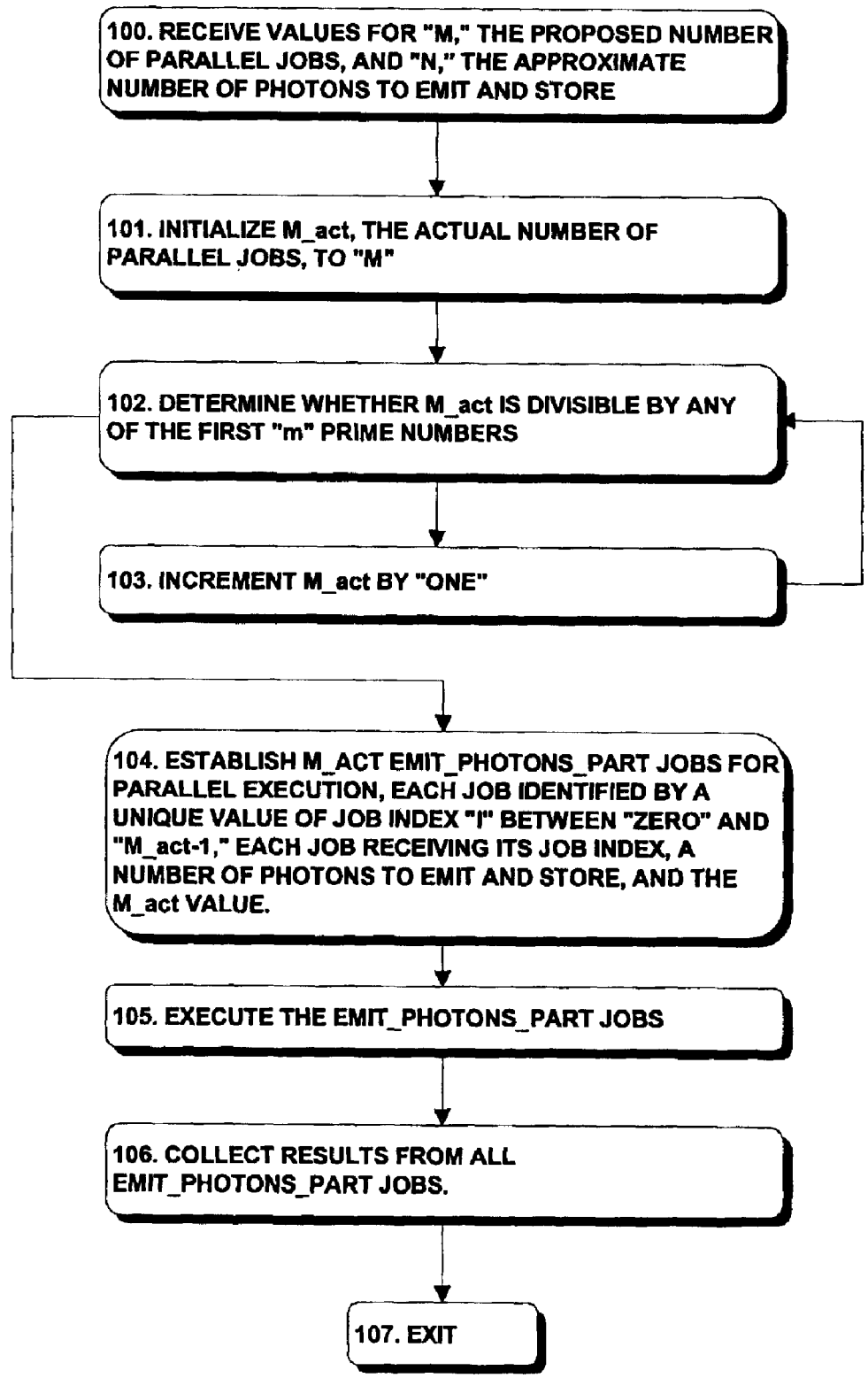

SYSTEM AND METHOD FOR RENDERING IMAGES USING A STRICTLY-DETERMINISTIC METHODOLOGY FOR GENERATING A COARSE SEQUENCE OF SAMPLE POINTS

INCORPORATION BY REFERENCE

This application claims the benefit of Provisional Application No. 60/297,139, filed Jun. 7, 2001.

U.S. patent application Ser. No. 08/880,418, filed Jun. 23, 1997, in the names of Martin Grabenstein, et al., entitled "System And Method For Generating Pixel Values For Pixels In An Image Using Strictly Deterministic Methodologies For Generating Sample Points," (hereinafter referred to as the Grabenstein application) assigned to the assignee of this application, incorporated by reference.

U.S. patent application Ser. No. 09/884,861, filed Jun. 19, 2001, in the name of Alexander Keller, entitled "System And Method For Generating Pixel Values For Pixels In An Image Using Strictly Deterministic Methodologies For Generating Sample Points," (hereinafter referred to as the Keller application) assigned to the assignee of this application, incorporated by reference.

FIELD OF THE INVENTION

The invention relates generally to the field of computer graphics, and more particularly to systems and methods for generating pixel values for pixels in an image being rendered using strictly-deterministic low-discrepancy sequences to provide sample points for generating estimates of values of integrals representing the pixel values.

BACKGROUND OF THE INVENTION

In computer graphics, a computer is used to generate digital data that represents the projection of surfaces of objects in, for example, a three-dimensional scene, illuminated by one or more light sources, onto a two-dimensional image plane, to simulate the viewing of the scene by the eye of, for example, a person or the recording of the scene by, for example, a camera. The camera may include a lens for projecting the image of the scene onto the image plane, or it may comprise a pinhole camera in which case no lens is used. The two-dimensional image is in the form of an array of picture elements (which are variable termed "pixels" or "Pels"), and the digital data generated for each pixel represents the color and luminance of the scene as projected onto the image plane at the point of the respective pixel in the image plane. The surfaces of the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. Since the integrals used in computer graphics generally will not have a closed-form solution, numerical methods must be used to evaluate them and thereby generate the pixel value. Typically, a conventional "Monte Carlo" method has been used in computer graphics to numerically evaluate the integrals. Generally, in the Monte Carlo method, to evaluate an integral $$\langle f \rangle = \int_0^1 f(x)dx \quad (1)$$

where f(x) is a real function on the "s"-dimensional unit cube $[0,1)^s$ (that is, an s-dimensional cube that includes "zero," and excludes "one"), first a number "N" statistically-independent randomly-positioned points xi, i=1, . . . , N, are generated over the integration domain. The random points xi are used as sample points for which sample values f(xi) are generated for the function f(x), and an estimate $\overline{f}$ for the integral is generated as $$\langle f \rangle \approx \overline{f} = \frac{1}{N}\sum_{i=1}^{N} f(x_i) \quad (2)$$

As the number of random points used in generating the sample points f(xi) increases, the value of the estimate $\overline{f}$ will converge toward the actual value of the integral $\langle f \rangle$. Generally, the distribution of estimate values that will be generated for various values of "N," that is, for various numbers of sample points, of being normal distributed around the actual value with a standard deviation which can be estimated by $$\sigma = \sqrt{\frac{1}{N-1}(\overline{f^2} - \overline{f}^2)} \quad (3)$$

if the points $x_i$ used to generate the sample values $f(x_i)$ are statistically independent, that is, if the points $x_i$ are truly positioned at random in the integration domain.

Generally, it has been believed that random methodologies like the Monte Carlo method are necessary to ensure that undesirable artifacts, such as Moiré patterns and aliasing and the like, which are not in the scene, will not be generated in the generated image. However, several problems arise from use of the Monte Carlo method in computer graphics. First, since the sample points $x_i$ used in the Monte Carlo method are randomly distributed, they may clump in various regions over the domain over which the integral is to be evaluated. Accordingly, depending on the set of points that are generated, in the Monte Carlo method for significant portions of the domain there may be no sample points $x_i$ for which sample values $f(x_i)$ are generated. In that case, the error can become quite large. In the context of generating a pixel value in computer graphics, the pixel value that is actually generated using the Monte Carlo method may not contain some elements which might otherwise be contained if the sample points xi were guaranteed to be more evenly distributed over the domain. This problem can be alleviated somewhat by dividing the domain into a plurality of sub-domains, but it is generally difficult to determine a priori the number of sub-domains into which the domain should be divided, and, in addition, in a multi-dimensional integration domain, the partitioning of the integration domain into sub-domains, which are preferably of equal size, can be quite complicated.

In addition, since the method makes use of random numbers, the error $|\overline{f}-\langle f \rangle|$ (where |x| represents the absolute value of the value "x") between the estimate value $\overline{f}$ and actual value $\langle f \rangle$ is probabilistic, and, since the error values for various large values of "N" are close to normal distribution around the actual value $\langle f \rangle$, only sixty-eight percent of the estimate values $\overline{f}$ that might be generated are guaranteed to lie within one standard deviation of the actual value $\langle f \rangle$.

Furthermore, as is clear from equation (3), the standard deviation decreases with increasing numbers "N" of sample points, proportional to the reciprocal of square root of "N"(that is, $\sqrt{1/N}$).

Thus, if it is desired to reduce the statistical error by a factor of two, it will be necessary to increase the number of sample points N by a factor of four, which, in turn, increases the computational load that is required to generate the pixel values, for each of the numerous pixels in the image.

Additionally, since the Monte Carlo method requires random numbers to define the coordinates of respective sample points xi in the integration domain, an efficient mechanism for generating random numbers is needed. Generally, digital computers are provided with so-called "random number" generators, which are computer programs which can be processed to generate a set of numbers that are approximately random. Since the random number generators use deterministic techniques, the numbers that are generated are not truly random. However, the property that subsequent random numbers from a random number generator are statistically independent should be maintained by deterministic implementations of pseudo-random numbers on a computer.

The Grabenstein application describes a computer graphics system and method for generating pixel values for pixels in an image using a strictly deterministic methodology for generating sample points, which avoids the above-described problems with the Monte Carlo method. The strictly deterministic methodology described in the Grabenstein application provides a low-discrepancy sample point sequence that ensures, a priori, that the sample points are generally more evenly distributed throughout the region over which the respective integrals are being evaluated. In one embodiment described in the Grabenstein application, the sample points that are used are based on a so-called Halton sequence. See, for example, J. H. Halton, *Numerische Mathematik*, Vol. 2, pp. 84–90 (1960) and W. H. Press, et al., Numerical Recipes in Fortran (2d Edition) page 300 (Cambridge University Press, 1992). In a Halton sequence generated for number base "b," where base "b" is a selected prime number, the "i-th" value of the sequence, represented by $H_b^i$ is generated by use of a "radical inverse" function $\Phi_b$ that is generally defined as $$\Phi_b: N_0 \to I \qquad (4)$$

$$i = \sum_{j=0}^{\infty} a_j(i) b^j \mapsto \sum_{j=0}^{\infty} a_j(i) b^{-j-1}$$

where $(\alpha_j)_{j=0}^{\infty}$ is the representation of "i" in integer base "b." Generally, a radical inverse of a value "k" is generated by (1) writing the value "i" as a numerical representation of the value in the selected base "b," thereby to provide a representation for the value as $D_M D_{M-1} \ldots D_2 D_1$, where $D_m (m=1,2,\ldots,M)$ are the digits of the representation, (2) putting a radix point (corresponding to a decimal point for numbers written in base ten) at the least significant end of the representation $D_M D_{M-1} \ldots D_2 D_1$ written in step (1) above, and (3) reflecting the digits around the radix point to provide $0.D_1 D_2 \ldots D_{M-1} D_M$, which corresponds to $H_b^i$.

It will be appreciated that, regardless of the base "b" selected for the representation, for any series of values, one, two, ... "k," written in base "b," the least significant digits of the representation will change at a faster rate than the most significant digits. As a result, in the Halton sequence $H_b^1, H_b^2, \ldots H_b^i$, the most significant digits will change at the faster rate, so that the early values in the sequence will be generally widely distributed over the interval from zero to one, and later values in the sequence will fill in interstices among the earlier values in the sequence. Unlike the random or pseudo-random numbers used in the Monte Carlo method as described above, the values of the Halton sequence are not statistically independent; on the contrary, the values of the Halton sequence are strictly deterministic, "maximally avoiding" each other over the interval, and so they will not clump, whereas the random or pseudo-random numbers used in the Monte Carlo method may clump.

It will be appreciated that the Halton sequence as described above provides a sequence of values over the interval from zero to one, inclusive along a single dimension. A multi-dimensional Halton sequence can be generated in a similar manner, but using a different base for each dimension.

A generalized Halton sequence, of which the Halton sequence described above is a special case, is generated as follows. For each starting point along the numerical interval from zero to one, inclusive, a different Halton sequence is generated. Defining the pseudo-sum $x \oplus_p y$ for any x and y over the interval from zero to one, inclusive, for any integer "p" having a value greater than two, the pseudo-sum is formed by adding the digits representing "x" and "y" in reverse order, from the most-significant digit to the least-significant digit, and for each addition also adding in the carry generated from the sum of next more significant digits. Thus, if "x" in base "b" is represented by $0.X_1 X_2 \ldots X_{M-1} X_M$, where each "$X_m$" is a digit in base "b," and if "y" in base "b" is represented by $0.Y_1 Y_2 \ldots Y_{N-1} Y_N$, where each "$Y_n$" is a digit in base "b" (and where "M," the number of digits in the representation of "x" in base "b", and "N," the number of digits in the representation of "y" in base "b", may differ), then the pseudo-sum "z" is represented by $0.Z_1 Z_2 \ldots Z_{L-1} Z_L$, where each "$Z_l$" is a digit in base "b" given by $Z_l = (X_l + Y_l + C_l)$ mod b, where "mod" represents the modulo function, and $$C_l = \begin{cases} 1 & \text{for } X_{l-1} + Y_{l-1} + Z_{l-1} \geq b \\ 0 & \text{otherwise} \end{cases}$$

is a carry value from the "1-1st" digit position, with $C_l$ being set to zero.

Using the pseudo-sum function as described above, the generalized Halton sequence that is used in the system described in the Grabenstein application is generated as follows. If "b" is an integer, and $x_0$ is an arbitrary value on the interval from zero to one, inclusive, then the "p"-adic von Neumann-Kakutani transformation $T_b(x)$ is given by $$T_p(x) := x \oplus_p \frac{1}{b}, \qquad (5)$$

and the generalized Halton sequence $x_0, x_1, x_2, \ldots$ is defined recursively as $$x_{n+1} = T_b(x_n) \qquad (6)$$

From equations (5) and (6), it is clear that, for any value for "b," the generalized Halton sequence can provide that a different sequence will be generated for each starting value of "x," that is, for each $x_0$. It will be appreciated that the Halton sequence $H_b^i$ as described above is a special case of the generalized Halton sequence (equations (5) and (6)) for $x_0 = 0$.

The Keller application also describes a computer graphics system and method for generating pixel values for pixels in an image using a strictly deterministic methodology, in this case using s-dimensional Hammersley point sets. S-dimensional Hammersley point sets are defined as $$U_{N,s}^{Hammersley}: \{0, \ldots, N-1\} \to I^s \tag{7}$$

$$i \mapsto x_i := \left(\frac{i}{N}, \Phi_{b_1}(i), \ldots, \Phi_{b_{s-1}}(i)\right),$$

where $I^s$ is the s-dimensional unit cube $[0,1)$, the number of points "N" in the set is fixed and $\Phi_{b_x}(i)$ is the radical inverse of "i" in base $b_x$, for bases $b_1, \ldots, b_{s-1}$, as sample points. The bases do not need to be prime, but they are preferably relatively prime to provide a relatively uniform distribution.

In addition, the Keller application also describes use of a scrambled Hammersley point set to reduce or eliminate a problem that can arise in connection with higher-dimensioned low-discrepancy sequences. Typically, the radical inverse function $\Phi_b$ has subsequences of b−1 equidistant values spaced by 1/b, which can result in correlation patterns. Although these correlation patterns are merely noticeable in the full s-dimensional space, they are undesirable since they are prone to aliasing. The Keller application describes a methodology that attenuates this effect by scrambling, which corresponds to application of a permutation to the digits of the b-ary representation used in the radical inversion. For a permutation a from a symmetric group $S_b$ over integers $0, \ldots, b-1$, the scrambled radical inverse is defined as $$\Phi_b: N_0 \times S_b \to I \tag{8}$$

$$(i, \sigma) \mapsto \sum_{j=0}^{\infty} \sigma(a_j(i))b^{-j-1} \Leftrightarrow i = \sum_{j=0}^{\infty} a_j(i)b^j.$$

If the permutation "σ" is the identity, the scrambled radical inverse corresponds to the unscrambled radical inverse. In one embodiment, the permutation σ is defined recursively as follows. Starting from the permutation $\sigma_2 = (0,1)$ for base b=2, the sequence of permutations is defined as follows:

(i) if the base "b" is even, the permutation $\sigma_b$ is generated by first taking the values of $$2\sigma_{\frac{b}{2}}$$

and appending the values of $$2\sigma_{\frac{b}{2}} + 1,$$

and (ii) if the base "b" is odd, the permutation $\sigma_b$ is generated by taking the values of $\sigma_{b-1}$, incrementing each value that is greater than or equal to $$\frac{b-1}{2}$$

by one, and inserting the value b−1 in the middle.

This recursive procedure results in the following permutations $\sigma_2 = (0,1)$ $\sigma_3 = (0,1,2)$ $\sigma_4 = (0,2,1,3)$ $\sigma_5 = (0,3,2,1,4)$ $\sigma_6 = (0,2,4,1,3,5)$ $\sigma_7 = (0,2,5,3,1,4,6)$ $\sigma_8 = (0,4,2,6,1,5,3,7) \ldots$ Accordingly, given the radical inverse for a value "i" in base "b," if the "k-th" digit of the representation for the radical inverse has the value "j," the "k-th" digit of the scrambled radical inverse has the value corresponding to the value of the "j-th" digit in the permutation $\sigma_b$ above. Use of the scrambled radical inverse, which may be applied to Halton and other low-discrepancy sequences as well as the Hammersley point set, reduces or eliminates the correlation patterns described above.

The use of a strictly deterministic low-discrepancy sequence can provide a number of advantages over the random or pseudo-random numbers that are used in connection with the Monte Carlo technique. Unlike the random numbers used in connection with the Monte Carlo technique, the low discrepancy sequences ensure that the sample points are more evenly distributed over a respective region or time interval, thereby reducing error in the image which can result from clumping of such sample points which can occur in the Monte Carlo technique. That can facilitate the generation of images of improved quality when using the same number of sample points at the same computational cost as in the Monte Carlo technique. However, problems can arise if it is desired to generate an image using a plurality of processors operating in parallel, since it will generally be desirable to ensure that each of the processors makes use of a low discrepancy sequence in its processing operations.

SUMMARY OF THE INVENTION

The invention provides a new and improved system and method for generating pixel values for pixels in an image being rendered using strictly-deterministic low-discrepancy sequences to provide sample points for generating estimates of values of integrals representing the pixel values, the strictly-deterministic low-discrepancy sequences being generated so that the system can perform processing operations using a plurality of processors operating in parallel.

In brief summary, in one aspect, the invention provides an improved system and method for generating sample points that can generate the sample points in parallel. The sample points can be used in processing in parallel, with the results subsequently collected and used as necessary in subsequent rendering operations. In accordance with the invention, sample points are generated using a coarse Halton sequence, which makes use of coarse radical inverse values $\Phi_b^{i,M}(j)$ as follows:

$$\Phi_b^{i,M}(j) = \Phi_b(jM+i) \tag{9},$$

where base "b" is preferably a prime number, but not a divisor of "M," and "i" is an integer. Using this definition, the s-dimensional coarse Halton sequence $U_s^{CHal,i,M}$, which may be used to define sample points for use in evaluating integrals, is defined as $$U_s^{CHal,i,M} = (\Phi_{b_1}^{i,M}(j), \ldots, \Phi_{b_s}^{i,M}(j)) \tag{10},$$

where $b_1, \ldots, b_s$ are the first "s" numbers that are not divisors of "M." Each value of "i" defines a subsequence that is low-discrepancy sequence , and so can be used in connection with processing. Similarly, the union of all subsequences for all values of "i" between "zero" and "M−1" is also a low-discrepancy sequence, so results of processing using the coarse Halton sequences for all such values of "i" can be collected together and used in the same manner as if the results had been generated using a Halton sequence to define the sample points.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides a computer graphic system and method for generating pixel values for pixels in an image of a scene, which makes use of a strictly-deterministic methodology for generating sample points for use in generating sample values for evaluating the integral or integrals whose function(s) represent the contributions of the light reflected from the various points in the scene to the respective pixel value, rather than the random or pseudo-random Monte Carlo methodology which has been used in the past. The strictly-deterministic methodology ensures a priori that the sample points will be generally more evenly distributed over the interval or region over which the integral(s) is (are) to be evaluated in a low-discrepancy manner.

Figure 1:
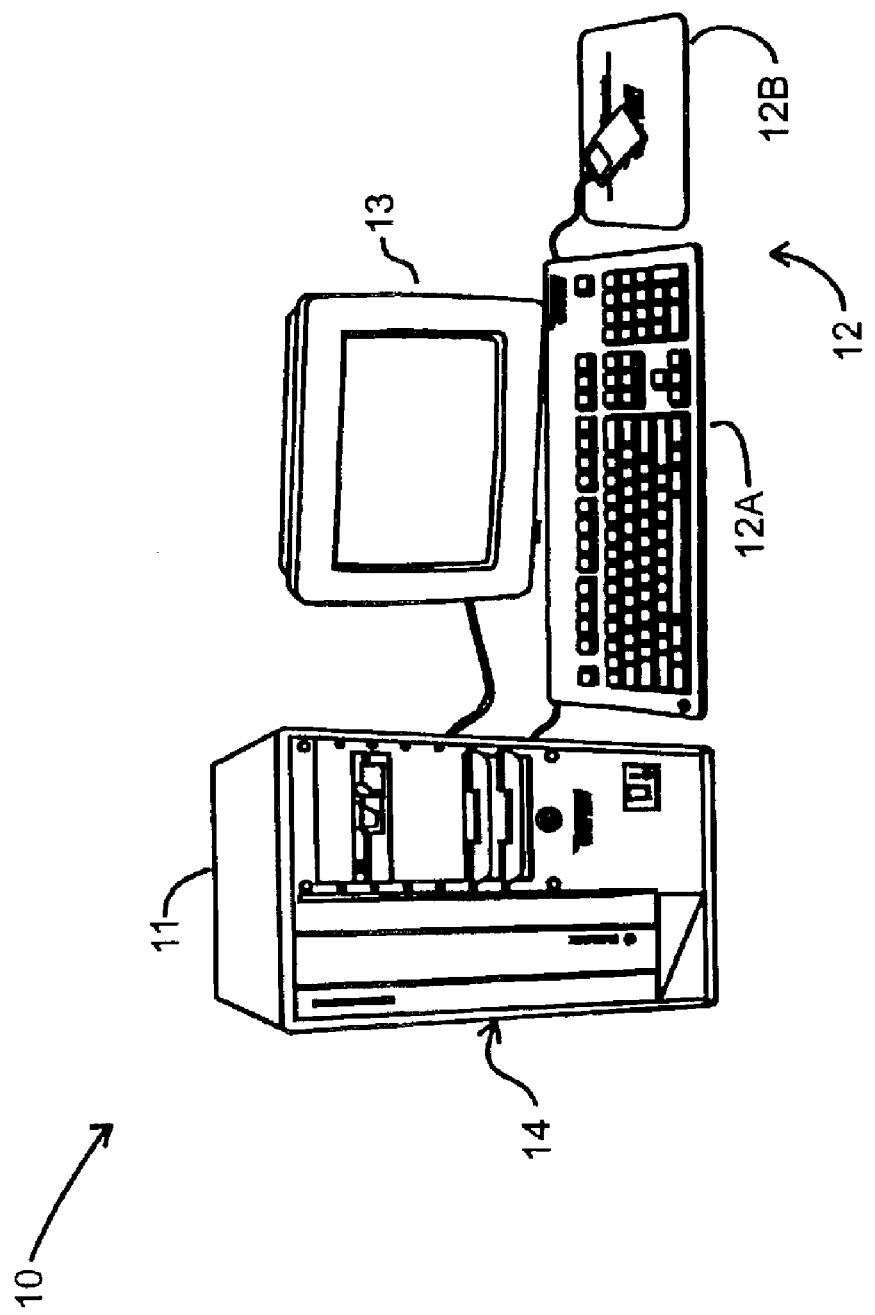
FIG. 1 depicts an illustrative computer graphics system constructed in accordance with the invention.

FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. If the processor module 11 includes a plurality of processor devices, the respective processor devices may be configured to process various portions of a single task in parallel, in which case the task may be executed more quickly than otherwise. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In accordance with the invention, the computer graphics system provides an arrangement that can facilitate parallelization of rendering of images, so that operations involved in image rendering can be processed by a plurality of processors in parallel, which can speed up rendering of an image. This will be described in connection with one facet of image rendering, in particular, photon emission, although it will be appreciated that the methodology can be extended to other facets. As noted above, the Grabenstein application describes a computer graphics system and method for generating pixel values for pixels in an image using a strictly deterministic methodology, in which sample points that are used are based on a so-called Halton sequence. In accordance with this aspect of the invention, the computer graphics system 10 makes use of what will be referred to herein as a coarse Halton sequence, which is defined as follows. If $\Phi_b(j)$ is the radical inverse of "j," given an integer "M" and a second integer "i," the coarse Halton sequence makes use of coarse radical inverse values $\Phi_b^{i,M}(j)$ as follows:

$$\Phi_b^{i,M}(j) = \Phi_b(jM+i) \tag{11}$$

where base "b" is preferably a prime number, but not a divisor of "M." Using this definition, the s-dimensional coarse Halton sequence $U_s^{CHal,i,M}$, which may be used to define sample points for use in evaluating integrals, is defined as $$U_s^{CHal,i,M} = (\Phi_{b_1}^{i,M}(j), \ldots, \Phi_{b_s}^{i,M}(j)) \tag{12}$$

where $b_1, \ldots, b_s$ are the first "s" numbers that are not divisors of "M," that is, they are relatively prime with respect to "M."

The computer graphics system 10 may also make use of a scrambled coarse Halton sequence using permutations σ as described above. In that case, the scrambled coarse inverse values $\Phi_b^{i,M}(j,\sigma_b b)$ as follows:

$$\Phi_b^{i,M}(j,\sigma_b) = \Phi_b(jM+i,\sigma_b) \quad (13),$$

where $\sigma_b$ is the permutation for the respective base "b" as described above in connection with the Keller application. Using this definition, the scrambled coarse s-dimensional Halton sequence $U_s^{CSHal,i,M}$ is defined as $$U_s^{CSHal,i,M} = (\Phi_{b_1}^{i,M}(j,\sigma_{b_1}), \ldots, \Phi_{b_1}^{i,M}(j,\sigma_{b_s})) \quad (14)$$

The following description will generally refer to the s-dimensional coarse Halton sequence $U_s^{CHal,i,M}$, although it should be recognized that the scrambled s-dimensional coarse Halton sequence $U_s^{CSHal,i,M}$ can be used instead.

The s-dimensional coarse Halton sequence $U_s^{CHal,i,M}$ and scrambled s-dimensional coarse Halton sequence $U_s^{CSHal,i,M}$ for different values of "i" are essentially arithmetical subsequences of Halton and scrambled Halton sequences, with radical inverses in bases "b" that divide "M" not being included. Both coarse and scrambled coarse Halton sequences are low-discrepancy sequences with a discrepancy that is similar to that exhibited by a Halton sequence as described above. The desirability of removing bases that evenly divide "M" can be illustrated by the following example. Consider "M" and base "b" both equal to two, and the 1-dimensional Halton sequence. In that case, the subsequence that is associated with even values of "i" is a coarse Halton sequence whose values lie in the interval [0,½), and the subsequence that is associated with odd values of "i" is a coarse Halton sequence whose values lie in the interval [½, 1), and so neither subsequence will exhibit low-discrepancy characteristics over the entire interval [0,1). On the other hand, if "M" is equal to three, base "b" equal to two, the subsequences that are associated with even and odd values of "i" are coarse Halton sequences whose values lie in the entire interval [0,1), and there will be no clumping in any portion of the interval. Moreover, since each subsequence is associated with a different value of "i," the methodology can ensure that all sequences are disjoint, that is, that no two subsequences will have the same value, if the value of "i" is less than the value of "M." Further, if the values of "i" that are used in generating the subsequences include all of the integers from "zero" to M−1, the union of all such subsequences is itself a low-discrepancy sequence.

The use of the s-dimensional coarse Halton sequence $U_s^{CHal,i,M}$ facilitates parallelizing various facets of image rendering, since each subsequence, associated with a respective value of "i," is itself a low-discrepancy sequence over the s-dimensional unit cube $[0,1)^s$, particularly if the subsequences are generated so that the union of all such subsequences is itself a low-discrepancy sequence, which, as noted above, can be ensured if values of "i" include all of the integers from "zero" to M−1. This will be described in connection with one facet of image rendering, in particular, photon emission, although it will be appreciated that the use of the coarse Halton sequence $U_s^{CHal,i,M}$ may find utility in connection with parallelizing other facets. Since the subsequences can be generated such that they are all disjoint, the computer graphics system 10 can perform photons emission in "M" jobs in parallel, with "i" being used as an index to identify the "i-th" job. After all of the jobs have been executed to emit photons until the desired number "N" have been stored, the computer graphics system 10 can collect and use the results from all of the jobs, since no two photons will have the same emission characteristics. Code Segment 1 is an illustrative segment of program code, in the C programming language.

| Code Segment 1 |
|---|
| (1) void emit_photons_all ( |
| (2)      int M,    /* proposed number of parallel jobs */ |
| (3)      int N    /* approximate number of photons to be stored */ |
|     ) |
|     { |
| (4)      int M_act;   /* actual number of parallel jobs */ |
| (5)      M_act=M  /* initially set the actual number of parallel jobs to be equal to the proposed number */ /* increase the actual number of parallel jobs until it is not divisible by "m" first prime numbers; here m=4 */ |
| (6a)     while (M_act % 2 == 0 ‖ M_act % 3 == 0 ‖ M_act % 5 == 0 ‖ M_act % 7 == 0) |
| (6b)     M_act++; |
|     } |
| (7)      parallel execute emit_photon_part (i, N/M_act, M_act) for i=0, . . . , M_act-1 |
| (8)      collect results |
|     } |
| (9) void emit_photons_part ( |
| (10)     int i,    /* "i" is used as job index */ |
| (11)     int N,   /* actual number of photons to be stored by the "i-th" job, equal to N/M_act argument in line (7) |
| (12)     int M    /* arithmetic sequence step to use, equal to M_act argument in line (7) |
|     ) |
|     { |
| (13a)    emit photons until N (value in line (11)) are stored using |
| (13b)    $U_s^{CHal,i,M}$ subsequence as sample points |
|     } |

The emit_photons_all sequence, comprising lines (1) through (8) of Code Segment 1, enables the computer graphics system 10 to store all of the photons that are to be stored during a rendering operation in connection with at least a portion of an image to be rendered. The emit_Photons_all sequence makes use of the emit_photons_part sequence in that operation. The emit_photons_part sequence is performed in a number of jobs, the number corresponding to an "actual" value M_act that is determined in lines (2) through (6b). The jobs can be performed in parallel by respective processors that are provided by the processor module 11.

Generally, in lines (2) through (6b) of the emit_photons_all sequence, the number of jobs is determined by determining the lowest number that is not divisible by the first "m" prime numbers, where "m" is a selected number. In the illustrative Code Segment 1, the value of "m" has been selected to be "four," with the values of the associated first "m" prime numbers being "two," "three," "five" and "seven." The value of "m" is used along with the value of "M," a proposed number of jobs, which is initialized in line (2), to determine a value for "M_act," which is the actual number of jobs in which emit_photons_part is to be executed. The value chosen for the proposed number of jobs "M" may be "one," or any other convenient value, and may correspond to the number of processors in the processor module 11 or a selected fraction thereof. The value for M_act is determined in lines (6a) and (6b). In Code Segment 1, the value of M_act will be incremented until it reaches the lowest value that is not divisible by the first "m" prime numbers. Accordingly, if the value of "m" is "four," and the proposed number of jobs "M" in line (2) has any value between "one" and "eleven," the value of the actual number of jobs M_act" will be determined to be "eleven,"

since that is the lowest number that is not divisible by the first four prime numbers. On the other hand, if value of the proposed number of jobs "M" in line (2) is "twenty," the value of the actual number of jobs M_act will be determined to be "twenty-three," since that is the lowest number above "twenty" that is not divisible by the first four prime numbers. The value of "m" may be selected by any of a number of criteria. In one embodiment, the value of "m" is selected to be small enough so that "M_act" will preferably not differ substantially from "M," since The value of "m" bay be selected to be at least the number of dimensions "s" to ensure that there are sufficient numbers of prime numbers for the bases $b_s$ that are to be used in generating the "s"-dimensional coarse Halton sequences $U_s^{CHal,i,M}$. As an alternative, the value of "m" may differ from "s," and may reflect a compromise, since Halton sequences that are generated using relatively small bases typically provide desirable sample points, and selecting "m" to be too large may cause such sequences to be avoided.

After the actual number of jobs M_act has been determined, the emit_photons_all sequence in line (7) uses the emit_photons_part sequence in lines (9) through (13b) to actually emit and store the photons. The emit_photons_part sequence makes use of the coarse Halton sequence $U_s^{CHal,i,M}$ described above in connection with equations (9) and (10) in connection with storing the photons. In line (7) of Code Segment 1, the emit_photons_all sequence actually calls the emit_photons_part sequence "M_act" times, each time providing values "i," "N/M_act" and "M_act" that are to be used in processing of the respective job. The values provided for "i" will range between "zero" and M_act, and are used as a job index. In addition, the value of "i" is used as "i" in the coarse Halton sequence $U_s^{CHal,i,M}$ for the respective job. The value of "M act" is used as "M" in the coarse Halton sequence $U_s^{CHal,i,M}$ for all of the jobs. Since the value of index "i" differs for each job, and ranges from "zero" to M_act, the Code Segment 1 will be assured that the coarse Halton sequences associated with the respective jobs will all differ, in which case all of the photons that are stored by all of the jobs will differ. The value of "N/M_act" that is provided in line (7) identifies the number of photons that are to be stored by the respective job, and corresponds to $$\lfloor \frac{N}{M\_act} \rfloor,$$

which, in turn, is the integer portion of "N," the total number of photons that are to be stored divided by "M_act," the number of jobs. The approximate total number "N" of photons to be stored is provided to the emit_photons_all sequence in line (3). It will be appreciated that, if the value of "M_act" does not evenly divide "N," the actual number of photons that will be stored will be somewhat less than "N" provided in line (3).

The emit_photon_part sequence (lines (9) through (13b) of Code Segment 1) receives as arguments "i," "N" and "M." All of the jobs that are created using the emit_photon part sequence the receives same values of "N" and "M," with the value of "N" corresponding to "N/M_act" in line (7) and the value of "M" corresponding to "M_act" in line (7). Each job that is created using the emit_photon_part sequence receives a unique value of "i." In executing each job, a number of photons are emitted using the "s"-dimensional coarse Halton sequence $U_s^{CHal,i,M}$ described above in connection with equations (9) and (10), and stored, until a number "N" (as defined in line (11), corresponding to $$\lfloor \frac{N}{M\_act} \rfloor$$

in line (7)) photons are stored, as represented by lines (13a) and 13(b) of Code Segment 1. Methodologies used by computer graphics systems such as computer graphics system 10 in connection with emitting and storing photons are known in the art and will not be described herein in detail; one methodology is described in the aforementioned Keller application.

After the various jobs have completed, in accordance with line (8) of the emit_photons_all sequence, the results from all of the jobs are collected. Since, as noted above, the values of the job indices "i" for the respective jobs are all unique and less than M_act, all of the stored photons generated by all of the jobs will be unique.

It will be appreciated that, if the value of "m," the number of the first prime numbers that are to be used in determination of the value for "M_act," the actual number of jobs into which the task is to be divided, is known a priori, the value of "M_act" could be fixed, since it need only be the next higher value that is not divisible by any of those prime numbers. However, by providing that the value of M_act is not fixed, but instead that it be determined at run-time by allowing a user to provide a value for argument "M" (reference line (2)) which operates as a floor for the value of "M_act," Code Segment 1 allows the number of emit_photons_part jobs to be adjusted, which can lead to better sampling properties than if the value of "M_act" were fixed.

The use of subsequences of the coarse Halton sequence $U_s^{CHal,i,M}$ in connection with parallelization can provide improved rendered images in comparison with other parallelization methodologies, such as, for example, dividing a Halton sequence into a plurality of subsequences using a selected indexing methodology. The coarse Halton sequence $U_s^{CHal,i,M}$ ensures that each subsequence will be a low-discrepancy sub-sequence, and that all will have substantially the same low-discrepancy properties. This will not necessarily be the case with other parallelization methodologies.

Figure 2A:
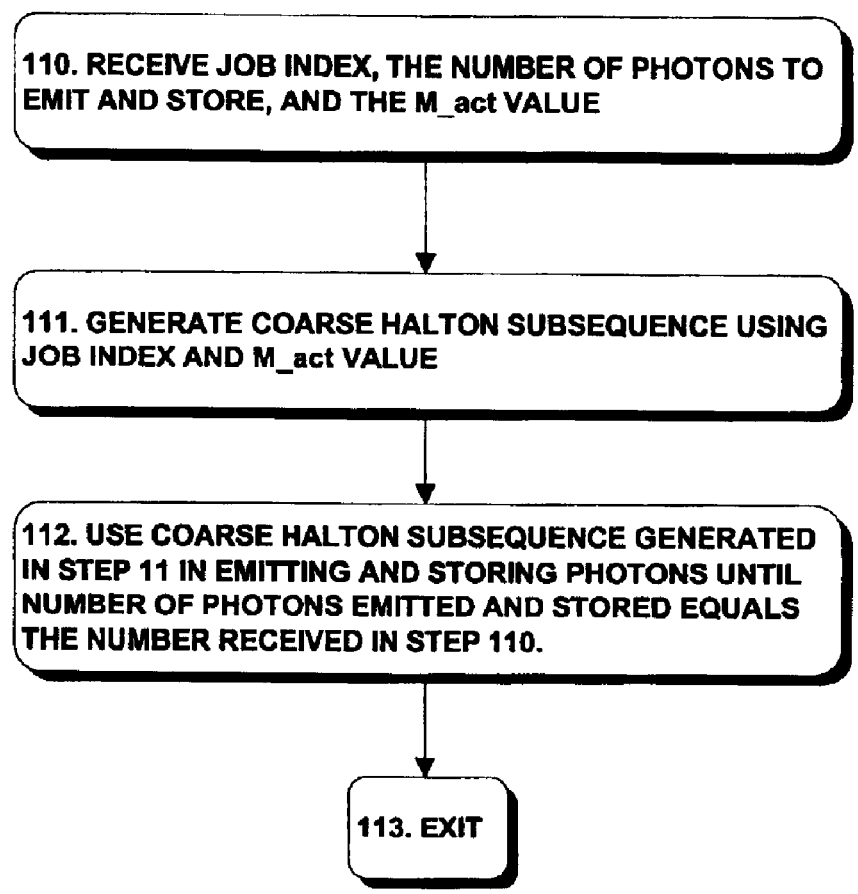
FIG. 2 is a flow chart depicting operations performed by the computer graphics system depicted in FIG. 1 in accordance with the invention.

FIG. 2 depicts a flow chart detailing operations performed by the computer graphics system in connection with Code Segment 1.

It will be appreciated that a number of changes may be made to the arrangement described above. For example, instead of the Halton or scrambled Halton sequence, other low-discrepancy strictly deterministic sequences may find utility.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer graphics system for generating a pixel value for a pixel in an image, the pixel being representative of a point in a scene, the computer graphics system generating the pixel value by an evaluation of an integral of a selected function, the computer graphics system comprising:
   A. a sample point generator configured to generate a set of sample points, the sample point generator being configured to use a predetermined coarse strictly-deterministic low-discrepancy sequence to generate the sample points, the predetermined coarse strictly-deterministic low-discrepancy sequence being a subset of a predetermined strictly-deterministic low-discrepancy sequence;
   B. a function evaluator configured to generate a plurality of function values each representing an evaluation of said selected function at one of the sample points generated by said sample point generator and use the function values in generating the pixel value.

2. A computer graphics system as defined in claim 1 in which sample point generator is configured to generate the predetermined coarse low-discrepancy sequence as a coarse Halton sequence.

3. A computer graphics system as defined in claim 2 in which the sample point generator is configured to generate the coarse Halton sequence using radical inverse values $\Phi_b^{i,M}(j)$ as follows:

$$\Phi_b^{i,M}(j) = \Phi_b(jM=i)$$

where base "b" is preferably a prime number, but not a divisor of "M," where the radical inverse function $\Phi_b$ is defined as $$\Phi_b: N_0 \to I$$

$$i = \sum_{j=0}^{\infty} a_j(i) b^j \mapsto \sum_{j=0}^{\infty} a_j(i) b^{-j-1},$$

where $(a_j)_{j=}^{\infty}$ is the representation of number "i" in integer base "b."

4. A computer graphics system as defined in claim 3 in which the sample point generator is configured to generate the coarse Halton sequence as a scrambled coarse Halton sequence in accordance with a predetermined permutation operator σ.

5. A computer graphics system as defined in claim 4 in which the sample point generator is configured to generate the scrambled coarse Halton sequence using the permutation operator σ from a symmetric group $S_b$ over integers 0, ..., b−1, such that the scrambled radical inverse is defined as $$\Phi_b: N_0 \times S_b \to I$$

$$(i, \sigma) \mapsto \sum_{j=0}^{\infty} \sigma(a_j(i)) b^{-j-1} \Leftrightarrow i = \sum_{j=0}^{\infty} a_j(i) b^j.$$

6. A computer graphics system as defined in claim 5 in which sample point generator is configured to generate the scrambled coarse Halton sequence in which the permutation operator σ is defined recursively, from the permutation $\sigma_2 = (0,1)$ for base b=2, with the sequence of permutations being defined as follows:
   (i) if the base "b" is even, the permutation $\sigma_b$ is generated by first taking the values of $$2\sigma_{\frac{b}{2}}$$

and appending the values of $$2\sigma_{\frac{b}{2}} + 1,$$

and
   (ii) if the base "b" is odd, the permutation $\sigma_b$ is generated by taking the values of $\sigma_{b-1}$, incrementing each value that is greater than or equal to $$\frac{b-1}{2}$$

by one, and inserting the value b−1 in the middle.

7. A computer graphics system as defined in claim 3 in which the sample point generator is configured to generate the coarse Halton sequence as an s-dimensional coarse Halton sequence $U_s^{CHal,i,M}$ as follows:

$$U_s^{CHal,i,M} = (\Phi_b^{i,M}(j), \ldots, \Phi_b^{i,M}(j))$$

where $b_1, \ldots, b_s$ are the first "s" prime numbers that are not divisors of "M."

8. A computer graphics system as defined in claim 3 in which the sample point generator is configured to generate a plurality of coarse Halton sequences, each associated with a different value of "i," each such coarse Halton sequence being referred to as a subsequence.

9. A computer graphics system as defined in claim 8 in which the function evaluator is configured to generate the plurality of function values each representing an evaluation of said selected function at one of the sample points generated by said sample point generator, the function evaluator being configured to evaluate the selected function in parallel for different subsequences.

10. A computer graphics system as defined in claim 8 in which the sample point generator is configured to generate subsequences for all values of "i" between "zero" and "M-1."

11. A computer graphics method for generating a pixel value for a pixel in an image, the pixel being representative of a point in a scene, the computer graphics method facilitating generation of the pixel value by an evaluation of an integral of a selected function, the computer graphics method comprising:
   A. a sample point generation step of generating a set of sample points, the sample point generation step including the step of using a predetermined coarse strictly-deterministic low-discrepancy sequence to generate the sample points, the predetermined coarse strictly-deterministic low-discrepancy sequence being a subset of a predetermined strictly-deterministic low-discrepancy sequence;
   B. a function evaluation step of generating a plurality of function values each representing an evaluation of said selected function at one of the sample points generated by said sample point generation step and using the function values in generating the pixel value.

12. A computer graphics method as defined in claim 11 in which sample point generation step includes the step of generating the predetermined coarse low-discrepancy sequence as a coarse Halton sequence.

13. A computer graphics method as defined in claim 12 in which the sample point generation step includes the step of generating the coarse Halton sequence using radical inverse values $\Phi_b^{i,M}(j)$ as follows:

$$\Phi_b^{i,M}(j)=\Phi_b(jM=i)$$

where base "b" is preferably a prime number, but not a divisor of "M," where the radical inverse function $\Phi_b$ is defined as $$\Phi_b: N_0 \to I$$

$$i = \sum_{j=0}^{\infty} a_j(i)b^j \mapsto \sum_{j=0}^{\infty} a_j(i)b^{-j-1},$$

where $(\alpha_j)_{j=0}^{\infty}$ is the representation of number "i" in integer base "b."

14. A computer graphics method as defined in claim 13 in which the sample point generation step includes the step of generating the coarse Halton sequence as a scrambled coarse Halton sequence in accordance with a predetermined permutation operator σ.

15. A computer graphics method as defined in claim 14 in which the sample point generation step includes the step of generating the scrambled coarse Halton sequence using the permutation operator σ from a symmetric group $S_b$ over integers $0, \ldots, b-1$, such that the scrambled radical inverse is defined as $$\Phi_b: N_0 \times S_b \to I$$

$$(i, \sigma) \mapsto \sum_{j=0}^{\infty} \sigma(a_j(i))b^{-j-1} \Leftrightarrow i = \sum_{j=0}^{\infty} a_j(i)b^j.$$

16. A computer graphics method as defined in claim 15 in which sample point generation step includes the step of generating the scrambled coarse Halton sequence in which the permutation operator σ is defined recursively, from the permutation $\sigma_2=(0,1)$ for base b=2, with the sequence of permutations being defined as follows:

(i) if the base "b" is even, the permutation $\sigma_b$ is generated by first taking the values of $$2\sigma_{\frac{b}{2}}$$

and appending the values of $$2\sigma_{\frac{b}{2}} + 1,$$

and (ii) if the base "b" is odd, the permutation $\sigma_b$ is generated by taking the values of $\sigma_{b-1}$, incrementing each value that is greater than or equal to $$\frac{b-1}{2}$$

by one, and inserting the value b−1 in the middle.

17. A computer graphics method as defined in claim 13 in which the sample point generation step includes the step of generating the coarse Halton sequence as an s-dimensional coarse Halton sequence $U_s^{CHal,i,M}$ as follows:

$$U_s^{CHal,i,M}=(\Phi_b^{i,M}(j), \ldots ,\Phi_b^{i,M}(j))$$

where $b_1, \ldots, b_s$ are the first "s" prime numbers that are not divisors of "M."

18. A computer graphics method as defined in claim 13 in which the sample point generation step includes the step of generating a plurality of coarse Halton sequences, each associated with a different value of "i," each such coarse Halton sequence being referred to as a subsequence.

19. A computer graphics method as defined in claim 18 in which the function evaluation step includes the step of generating the plurality of function values each representing an evaluation of said selected function at one of the sample points generated by said sample point generation step, the function evaluation step being configured to evaluate the selected function in parallel for different subsequences.

20. A computer graphics method as defined in claim 18 in which the sample point generation step includes the step of generating subsequences for all values of "i" between "zero" and "M−1."

21. A computer program product for use in connection with a computer to provide a computer graphics system for generating a pixel value for a pixel in an image, the pixel being representative of a point in a scene, the computer graphics system generating the pixel value by an evaluation of an integral of a selected function, the computer program product comprising a computer-readable medium having encoded thereon:

A. a sample point generator module configured to enable the computer to generate a set of sample points, the sample point generator module being configured to enable the computer to use a predetermined coarse strictly-deterministic low-discrepancy sequence to generate the sample points, the predetermined coarse strictly-deterministic low-discrepancy sequence being a subset of a predetermined strictly-deterministic low-discrepancy sequence;

B. a function evaluator module configured to enable the computer to generate a plurality of function values each representing an evaluation of said selected function at one of the sample points generated by said sample point generator module and use the function values in generating the pixel value.

22. A computer program product as defined in claim 21 in which sample point generator module is configured to enable the computer to generate the predetermined coarse low-discrepancy sequence as a coarse Halton sequence.

23. A computer program product as defined in claim 22 in which the sample point generator module is configured to enable the computer to generate the coarse Halton sequence using radical inverse values $\Phi_b^{i,M}(j)$ as follows:

$$\Phi_b^{i,M}(j)=\Phi_b(jM=i)$$

where base "b" is preferably a prime number, but not a divisor of "M," where the radical inverse function $\Phi_b$ is defined as $$\Phi_b: N_0 \to I$$

$$i = \sum_{j=0}^{\infty} a_j(i)b^j \mapsto \sum_{j=0}^{\infty} a_j(i)b^{-j-1},$$

where $(\alpha_j)_{j=0}^{\infty}$ is the representation of number "i" in integer base "b."

24. A computer program product as defined in claim 23 in which the sample point generator module is configured to enable the computer to generate the coarse Halton sequence as a scrambled coarse Halton sequence in accordance with a predetermined permutation operator σ.

25. A computer program product as defined in claim 24 in which the sample point generator module is configured to enable the computer to generate the scrambled coarse Halton sequence using the permutation operator σ from a symmetric group $S_b$ over integers 0, . . . ,b−1, such that the scrambled radical inverse is defined as $$\Phi_b: N_0 \times S_b \to I$$

$$(i, \sigma) \mapsto \sum_{j=0}^{\infty} \sigma(a_j(i))b^{-j-1} \Leftrightarrow i = \sum_{j=0}^{\infty} a_j(i)b^j.$$

26. A computer program product as defined in claim 25 in which sample point generator module is configured to enable the computer to generate the scrambled coarse Halton sequence in which the permutation operator σ is defined recursively, from the permutation $\sigma_2=(0,1)$ for base b=2, with the sequence of permutations being defined as follows:

(i) if the base "b" is even, the permutation $\sigma_b$ is generated by first taking the values of $$2\sigma_{\frac{b}{2}}$$

and appending the values of $$2\sigma_{\frac{b}{2}} + 1,$$

and (ii) if the base "b" is odd, the permutation $\sigma_b$ is generated by taking the values of $\sigma_{b-1}$, incrementing each value that is greater than or equal to $$\frac{b-1}{2}$$

by one, and inserting the value b−1 in the middle.

27. A computer program product as defined in claim 23 in which the sample point generator module is configured to enable the computer to generate the coarse Halton sequence as an s-dimensional coarse Halton sequence $U_s^{CHal,i,M}$ as follows:

$$U_s^{CHal,i,M} = (\Phi_b^{i,M}(j), \ldots, \Phi_b^{i,M}(j))$$

where $b_1, \ldots, b_s$ are the first "s" prime numbers that are not divisors of "M."

28. A computer program product as defined in claim 23 in which the sample point generator module is configured to enable the computer to generate a plurality of coarse Halton sequences, each associated with a different value of "i," each such coarse Halton sequence being referred to as a subsequence.

29. A computer program product as defined in claim 28 in which the function evaluator module is configured to enable the computer to generate the plurality of function values each representing an evaluation of said selected function at one of the sample points generated by said sample point generator module, the function evaluator module being configured to enable the computer to evaluate the selected function in parallel for different subsequences.

30. A computer program product as defined in claim 28 in which the sample point generator module is configured to enable the computer to generate subsequences for all values of "i" between "zero" and "M−1."

* * * * *